(12) United States Patent
Yamada

(10) Patent No.: US 7,543,825 B2
(45) Date of Patent: Jun. 9, 2009

(54) IN-WHEEL MOTOR VEHICLE

(75) Inventor: Ichiji Yamada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 79 days.

(21) Appl. No.: 11/854,975

(22) Filed: Sep. 13, 2007

(65) Prior Publication Data

US 2008/0066976 A1  Mar. 20, 2008

(30) Foreign Application Priority Data

Sep. 15, 2006  (JP) .............................. 2006-251707

(51) Int. Cl.
  *B60G 25/00*  (2006.01)
(52) U.S. Cl. ................ 280/5.52; 280/5.521; 280/5.522; 280/5.502; 280/5.507; 280/5.513; 280/86.758; 280/124.104; 280/124.105; 280/124.106; 180/65.1; 180/65.5
(58) Field of Classification Search ............. 280/5.502, 280/5.507, 5.513, 5.52, 5.521, 5.522, 86.758, 280/124.104, 124.105, 124.106; 180/65.1, 180/65.5
See application file for complete search history.

(56) References Cited

U.S. PATENT DOCUMENTS 3,858,901 A * 1/1975 Johnson ................ 280/124.138
4,822,073 A * 4/1989 Tanahashi et al. ....... 280/124.15
4,835,714 A * 5/1989 Sano et al. ................... 700/279
4,957,308 A * 9/1990 Takizawa ............. 280/124.138
5,697,633 A * 12/1997 Lee ...................... 280/124.136
5,701,248 A * 12/1997 Wanke .......................... 701/70
5,821,434 A * 10/1998 Halliday ................. 73/862.541
6,173,978 B1 * 1/2001 Wagner ............... 280/124.128
6,874,793 B2 * 4/2005 Choudhery .............. 280/5.521

FOREIGN PATENT DOCUMENTS

| DE | 699 18 572 T2 | 8/2005 |
| JP | 5-116545 | 5/1993 |
| JP | 5-139138 | 6/1993 |
| JP | 2005-312190 | 11/2005 |
| JP | 2005-329817 | 12/2005 |
| JP | 2006-67646 | 3/2006 |

* cited by examiner

*Primary Examiner*—Christopher P Ellis
*Assistant Examiner*—Jacob Meyer
(74) *Attorney, Agent, or Firm*—Oblon, Spivak, McClelland, Maier & Neustadt, P.C.

(57) ABSTRACT

A four-wheel vehicle is provided with an in-wheel motor in each of a front wheel and a rear wheel and has approximately the same roll center heights of the front wheel and the rear wheel. The relation between a change in a kingpin offset and a change in a wheel stroke for at least any one of the front wheel and the rear wheel of the four-wheel vehicle is determined based on at least any one of braking force distribution and driving force distribution between the front wheel and the rear wheel.

8 Claims, 9 Drawing Sheets

CONVENTIONAL VEHICLE

IN-WHEEL MOTOR

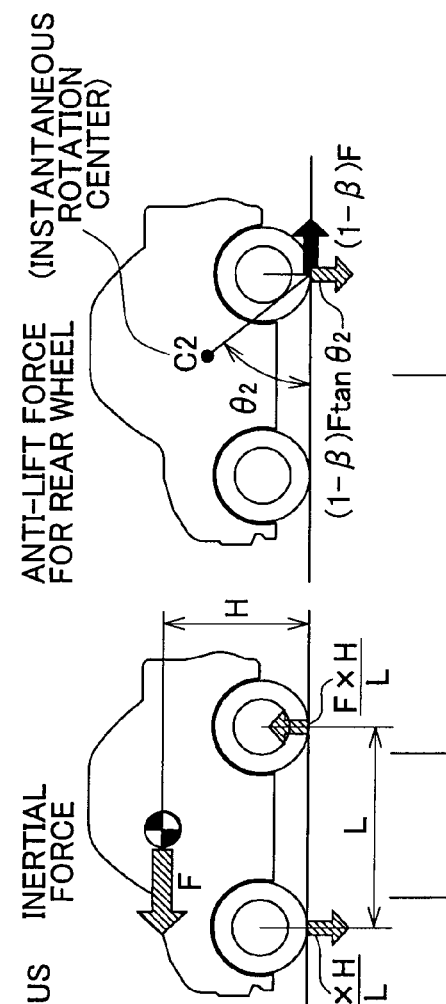
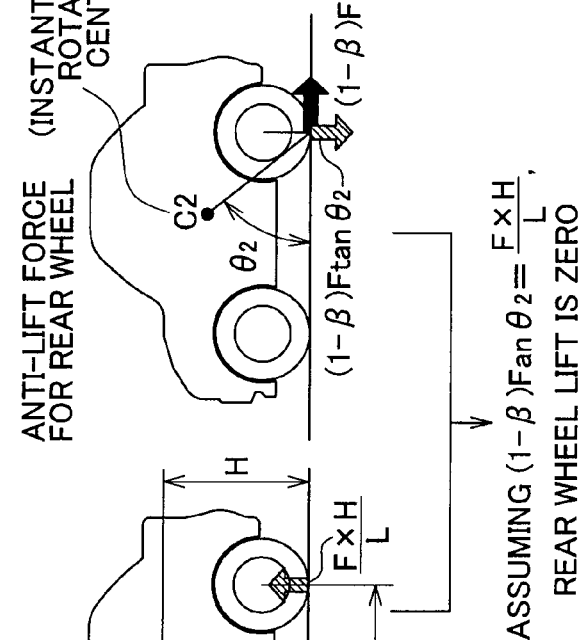
FIG. 5A
FIG. 5B ANTI-DIVE FORCE FOR FRONT WHEEL
FIG. 5C INERTIAL FORCE
FIG. 5D ANTI-LIFT FORCE FOR REAR WHEEL

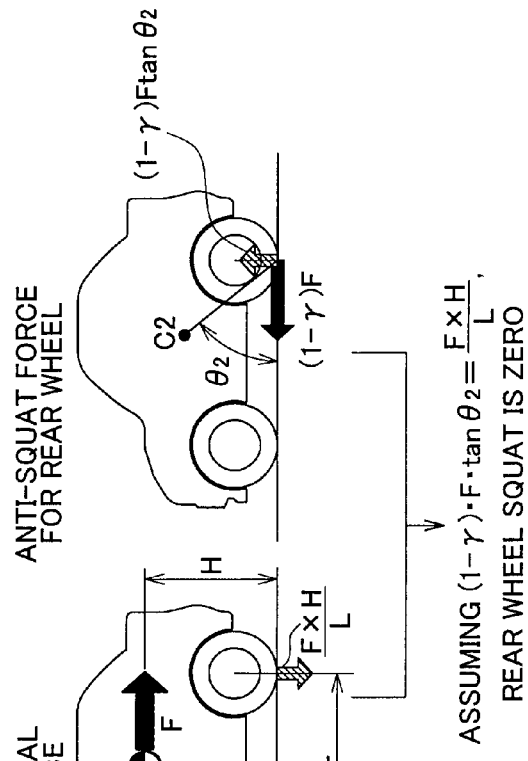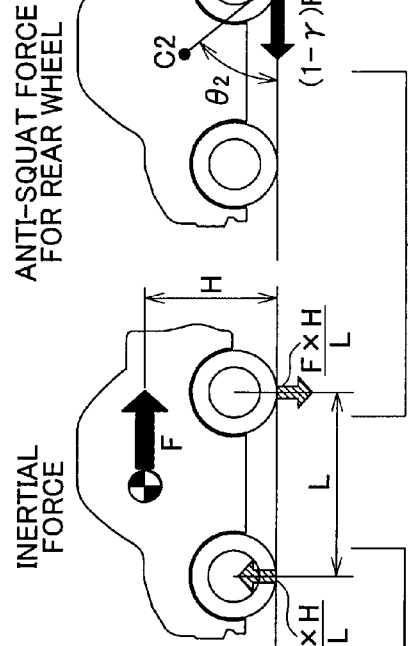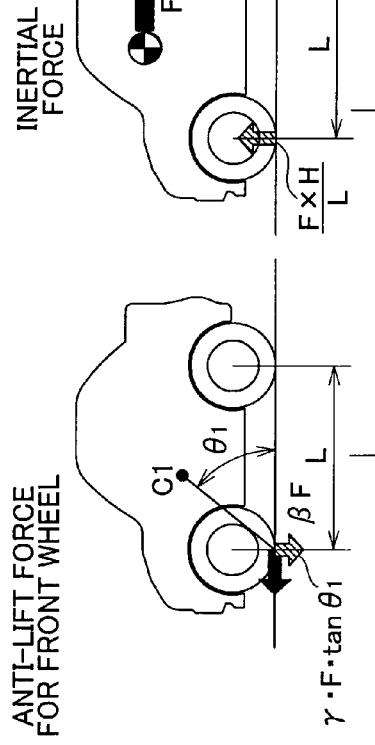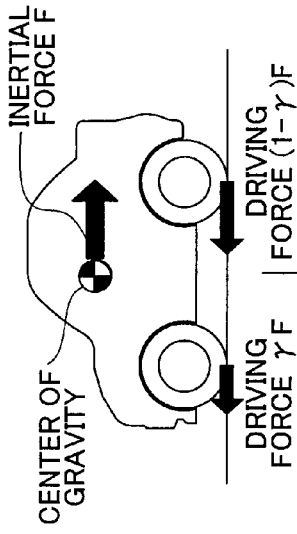

FRONT WHEEL

REAR WHEEL

IN-WHEEL MOTOR VEHICLE

INCORPORATION BY REFERENCE

The disclosure of Japanese Patent Application No. 2006-251707 filed on Sep. 15, 2006 including the specification, drawings and abstract is incorporated herein by reference in its entirety.

BACKGROUND OF THE INVENTION

1. Field of the Invention

The present invention relates to a four-wheel vehicle having in-wheel motors in front and rear wheels such that a kingpin offset of the front and/or rear wheel is determined to improve the stability of the vehicle.

2. Description of the Related Art

In-wheel motor vehicles are known in the art in which electric motors are provided in the front and rear wheels as driving means. In such in-wheel motor vehicle, there is a disadvantage that a heavy steering effort may be felt because each wheel has an electric motor, a ball joint in a suspension system is consequentially placed inward of the vehicle, and thus the kingpin offset becomes large. In order to prevent such disadvantage, Japanese Patent Application Publication No. 5-116545 (JP-A-5-116545), for example, describes that a wheel disc is formed in an inward concave shape along an axle shaft, the ball joint of a lower arm is disposed in the space determined by the concave shape to be close to the wheel disc, and thus the kingpin offset is made small.

Japanese Patent Application Publication No. 2005-329817 (JP-A-2005-329817) describes an in-wheel motor having a hollow first motor and a hollow second motor concentric with each other. The outside diameter of the second motor is determined to be smaller than the inside diameter of the first motor so that a part of the second motor is positioned inside the first motor. Accordingly, a lower joint is disposed adjacently to an inner peripheral surface of a rim of the wheel, and a kingpin axis is determined at an appropriate position and angle.

In addition, Japanese Patent Application Publication No. 2006-67646 (JP-A-2006-67646) describes the control of driving and braking amount of an in-wheel motor based on a gyro moment about the kingpin axis and the kingpin offset of the in-wheel motor to suppress vibration caused by the gyro moment.

However, the cited references do not describe or teach at all how to determine the kingpin offset to stabilize the behavior of the vehicle.

Regarding the determination of the kingpin offset, the conventional rear-wheel-drive four-wheel vehicle with an engine as the driving means has, as shown in FIG. 4A, driving force and braking force are generated at different points in the wheel, and therefore, it is possible to determine the point of application of the driving force and the point of application of the braking force on the opposite sides across the kingpin axis. In other words, the point where the driving force is generated is the center of the wheel with a drive shaft, the point where the braking force is generated is the contact patch of a tire, and therefore, those forces are generated at different positions. The kingpin axis (or fictitious kingpin axis if the suspension system does not have the kingpin axis; hereinafter, the actual kingpin axis and the fictitious kingpin axis are collectively referred to as "kingpin axis") is positioned between the point where the driving force is generated and the point where the braking force is generated to be set in a negative offset. Therefore, the moment of a force is generated about the kingpin axis in braking to point the tire to toe-in, and thus the vehicle can stabilize.

However, the in-wheel motor vehicle has, as shown in FIG. 4B, both the points of application of the driving force and the braking force on the contact patch of the tire, so that the kingpin axis cannot be positioned, as the conventional vehicle, between the point where the driving force is generated and the point where the braking force is generated, and therefore, the kingpin offset needs to be set to zero. Nevertheless, the behavior of the vehicle may become unstable due to the change of bound or rebound of the vehicle caused by weight shift during the braking and the driving.

SUMMARY OF THE INVENTION

The present invention proposes a four-wheel in-wheel motor vehicle in which a kingpin offset is determined so as to stabilize the behavior of the vehicle.

The four-wheel vehicle according to the first aspect of the present invention includes a front wheel and a rear wheel each provided with an in-wheel motor. The four-wheel vehicle has approximately the same roll center heights of the front wheel and the rear wheel. A relation between a change in a kingpin offset and a change in a wheel stroke for at least one of the front wheel and the rear wheel is determined based on at least one of braking force distribution and driving force distribution between the front wheel and the rear wheel. Accordingly, the behavior of the four-wheel in-wheel motor vehicle can be stabilized in braking and/or driving.

A proportion of a ratio of the change in the kingpin offset to the change in the wheel stroke for the front wheel to the same ratio for the rear wheel may be determined to be greater than a distribution ratio of a braking force for the front wheel relative to a distribution ratio of a braking force for the rear wheel of the four-wheel vehicle in braking. Thereby, the behavior of the vehicle can be stabilized in braking.

A proportion of a ratio of the change in the kingpin offset to the change in the wheel stroke for the rear wheel to the same ratio for the front wheel may be determined to be smaller than a distribution ratio of a driving force for the front wheel relative to a distribution ratio of a driving force for the rear wheel of the four-wheel vehicle in driving. Thereby, the behavior of the vehicle can be stabilized in driving.

The four-wheel vehicle according to the second aspect of the present invention includes a front wheel and a rear wheel each provided with an in-wheel motor. The roll center heights of the front wheel and the rear wheel are different. A proportion of a ratio of a change in a kingpin offset to a change in a wheel stroke for the front wheel to the same ratio for the rear wheel is determined to be greater than a ratio of an anti-dive force for the front wheel to an anti-lift force for the rear wheel in braking. Therefore, the behavior of the vehicle having different roll center heights of the front and the rear wheels can be stabilized in braking.

The four-wheel vehicle according to the third aspect of the present invention includes a front wheel and a rear wheel each provided with an in-wheel motor, and roll center heights of the front wheel and the rear wheel are different. A proportion of a ratio of a change in a kingpin offset to a change in a wheel stroke for the rear wheel to the same ratio for the front wheel is determined to be smaller than a ratio of an anti-lift force for the front wheel to an anti-squat force for the rear wheel in driving. Therefore, the behavior of the vehicle having different roll center heights of the front and the rear wheels can be stabilized in driving.

The four-wheel vehicle according to the fourth aspect of the present invention includes a front wheel and a rear wheel each provided with an in-wheel motor. The kingpin offsets for the front wheel and the rear wheel are determined to be negative in braking. Thereby, the behavior of the four-wheel in-wheel motor vehicle can be stabilized in braking.

The four-wheel vehicle according to the fifth aspect of the present invention includes a front wheel and a rear wheel each provided with an in-wheel motor. A ratio of a change in a kingpin offset to a change in a wheel stroke for the front wheel is determined to be greater than a ratio of a change in a kingpin offset to a change in a wheel stroke for the rear wheel when the vehicle is braking or driving. Thereby, the behavior of the four-wheel in-wheel motor vehicle can be stabilized.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 5A shows relations of resultant forces applied to the four-wheel in-wheel motor vehicle having different roll center heights between a front wheel and a rear wheel in braking;

FIG. 5B shows front wheel anti-dive forces applied to the four-wheel in-wheel motor vehicle according to the embodiment;

FIG. 5C shows vertical inertial forces applied to the front and the rear wheels of the four-wheel in-wheel motor vehicle according to the embodiment;

FIG. 5D shows rear wheel anti-lift forces applied to the four-wheel in-wheel motor vehicle according to the embodiment;

FIG. 6A shows resultant forces applied to the four-wheel in-wheel motor vehicle having different roll center heights between a front wheel and a rear wheel in driving;

FIG. 6B shows front wheel anti-lift forces applied to the four-wheel in-wheel motor vehicle according to the embodiment;

FIG. 6C shows vertical inertial forces applied to the front and the rear wheels of the four-wheel in-wheel motor vehicle according to the embodiment;

FIG. 6D shows rear wheel anti-squat forces applied to the four-wheel in-wheel motor vehicle according to the embodiment;

DETAILED DESCRIPTION OF EMBODIMENTS

The present invention will be described hereinafter with reference to the drawings.

Figures 1A, 1B:
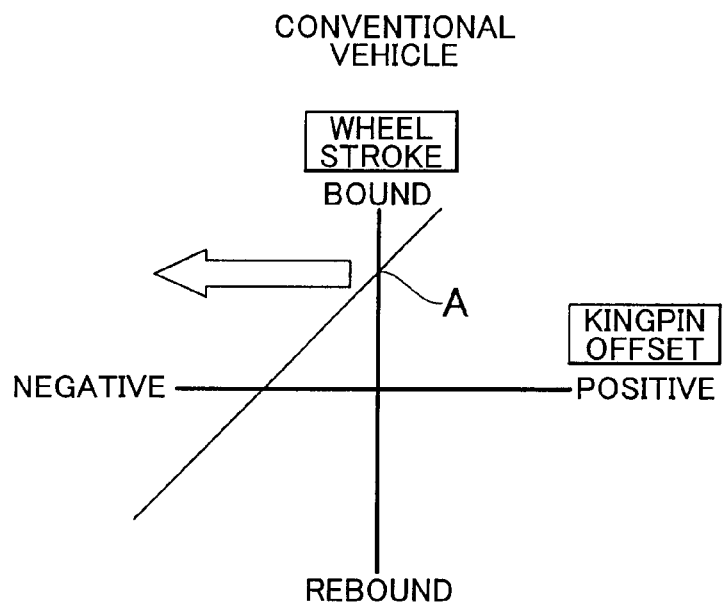
FIG. 1A is a chart showing an example of a suspension characteristic of a rear wheel of a conventional rear-wheel-drive vehicle.
FIG. 1B shows charts illustrating suspension characteristics of a four-wheel in-wheel motor vehicle according to an embodiment of the present invention.

FIGS. 1A and 1B are charts illustrating the determination of a kingpin offset for the four-wheel in-wheel motor vehicle according to an embodiment of the present invention. With FIGS. 1A and 1B, a description will be made first of a case that the roll center heights for the front and the rear wheels are approximately the same.

Figure 4A:
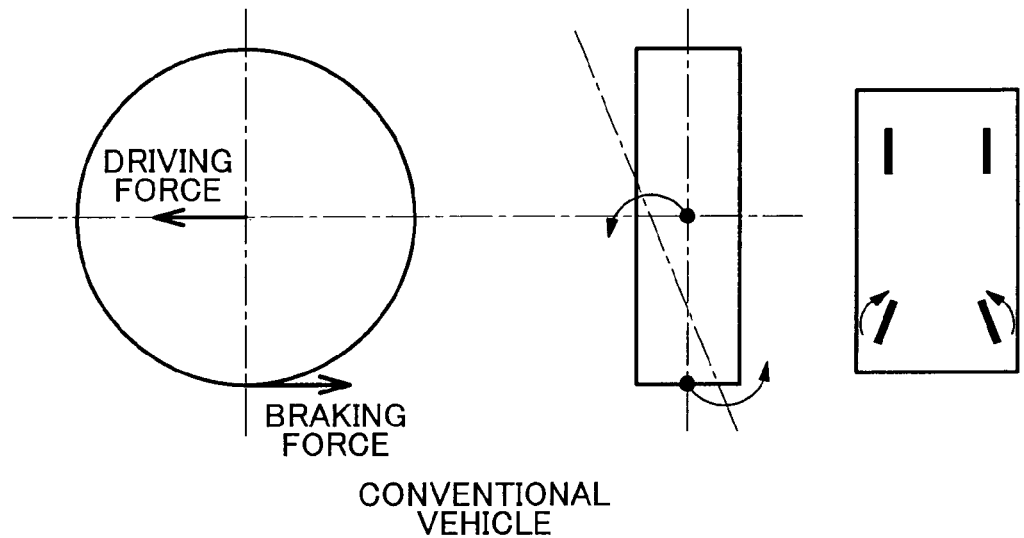
FIG. 4A shows the forces applied to a tire of the conventional vehicle.

FIG. 1A is a chart showing an example of a suspension characteristic of a rear wheel of a conventional rear-wheel-drive vehicle driven by an engine. In FIG. 1A, the vertical axis shows a wheel stroke, and the horizontal axis shows a kingpin offset. The wheel stroke in the vertical axis represents a length of vertical motion of the wheel, and the positive side indicates the state that a suspension spring is compressed, that is, a load is applied to the tire, and the negative side indicates the state that the suspension spring is expanded, that is, a load is not applied to the tire. The kingpin offset in the other axis means a length between a point where an extended line of the kingpin axis intersects with a road surface and the center point of the contact patch of the tire. In other words, as shown in FIG. 4A, when the point where the extended line of the kingpin axis intersects with the road surface is located in the outside from the center point of the tire, it means that the kingpin offset is negative. On the other hand, when the point where the extended line of the kingpin axis intersects with the road surface is located in the inside from the center point of the tire, it means that the kingpin offset is positive. The horizontal axis of FIG. 1A indicates the magnitude of the length. FIG. 1A depicts how the kingpin offset changes relative to the changes in the length of the vertical motion of the wheel during the traveling of the vehicle.

In FIG. 1A, a straight line downward to the left and upward to the right is drawn, which is a suspension characteristic showing an example of a conventional rear suspension. This suspension characteristic is determined such that the kingpin offset is set to be as negative as possible. That is, the kingpin offset is determined to be negative when the wheel stroke is in all the rebound range and a part of the bound range up to a certain point (point A). For example, the load applied to the vehicle in braking becomes large in the front wheel, so that the rear wheel is in the rebound. The kingpin offset is determined to be reliably negative at that time. On the other side, the load applied to the vehicle in driving becomes large in the rear wheel, so that the rear wheel is in the bound. At that time, the kingpin offset is determined to be negative in the range up to the certain point (point A) in the bound and to be positive when a bound amount exceeds the point A. This is because, as shown in FIG. 4A, the conventional vehicle has the points of application of the driving force in the vicinity of the center point of the wheel and the points of application of the braking force in the contact patch of the tire with the road surface, and therefore, when the kingpin offset is determined to be essentially negative, the moment that causes the wheel to always point in an inward direction in the negative state is generated to apply the force that makes the wheel toe-in. That is, determining the kingpin offset to negative irrespective of whether the vehicle is in braking or driving allows the vehicle to improve its straight stability, and the force in the direction that makes the vehicle weak understeer is applied to stabilize and restore to the normal behavior. Therefore, when the characteristic of the rear wheel as the driving wheel is set to more negative side than the suspension characteristic shown in FIG. 1A, the conventional suspension can be set to essentially a stable characteristic.

Figure 4B:
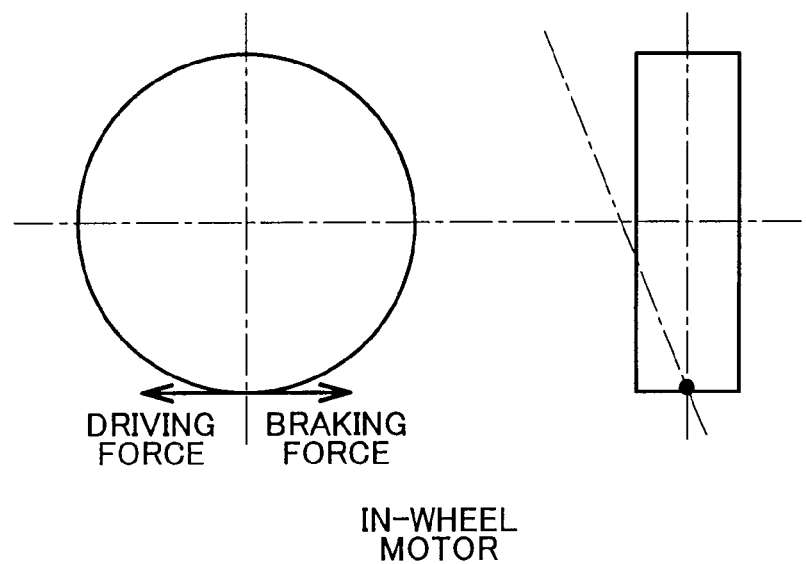
FIG. 4B shows the forces applied to a tire of the in-wheel motor vehicle.

On the other hand, FIG. 1B shows charts illustrating examples of the determination of the suspension characteristics of a four-wheel in-wheel motor vehicle according to the embodiment of the present invention. The four-wheel in-wheel motor vehicle has, as shown in FIG. 4B, the same point of application of the driving force and the braking force, and therefore, when the characteristic of the wheel is simply set to be negative as the conventional art, there may be a case that the aforementioned moment is not generated successfully. Thus, the determination as shown in FIG. 1B is made.

The right chart of FIG. 1B shows the relation between the wheel stroke and the kingpin offset for the rear wheel, and the left chart of FIG. 1B shows the relation between the wheel stroke and the kingpin offset for the front wheel. The right chart of FIG. 1B shows a straight line downward to the left and upward to the right as the characteristic shown in FIG. 1A, but has a different point that the kingpin offset becomes zero when the wheel stroke becomes zero. On the other hand, the left chart of FIG. 1B shows a reverse characteristic to the rear wheel having a slope upward to the left and downward to the right. The determination of the kingpin offset to be zero when the wheel stroke becomes zero is the same as that for the rear wheel.

First, the behavior of the vehicle in braking will be studied. In braking of the vehicle, the weight is shifted to the front side than in driving, and thus more load is applied to the front wheel than to the rear wheel. That is, the front wheel is in bound, and the rear wheel is in rebound. At this time, because the tire has load dependence, a frictional force on the tire becomes large and the gripping characteristic of the tire is exerted effectively when more loads are applied to the tire, and thus larger braking force is applied to the front wheel than to the rear wheel and braking force distribution to the front wheel becomes large.

The above state means that, in FIG. 1B, the front wheel is in a state shown as an area (a) and the rear wheel is in a state shown as an area (b). In this state, the kingpin offset is determined to be negative in both the area (a) for the front wheel and the area (b) for the rear wheel, that is, the kingpin offset is determined such that the vehicle is restored and stabilized to its normal behavior. However, since a larger braking force is applied to the front wheel than to the rear wheel in this state, the behavior of the vehicle becomes more stable when the kingpin offset of the front wheel is determined to be more negative so that a larger force that makes the wheel toe-in is applied to the front wheel than to the rear wheel. In order to achieve the above condition, the ratio of change in the kingpin offset relative to the change in the wheel stroke is determined to be larger for the front wheel than for the rear wheel. That is, the slope of the line (absolute value; the same meaning is applied hereinafter) showing the suspension characteristic in the area (a) in FIG. 1B is determined to be smaller than the slope of the line showing the suspension characteristic in the area (b). Furthermore, when the ratio of the slope of the line showing the suspension characteristic in the area (a) to the slope of the line showing the suspension characteristic in the area (b) is larger than a distribution ratio of the braking force of the front wheel to the rear wheel, a sufficient effect proportional to the braking force can be obtained. Thus, the proportion of the ratio of the change in the kingpin offset to the change in the wheel stroke for the line showing the suspension characteristic in the area (a) to the same ratio for the line showing the same characteristic in the area (b) may be determined to be greater than the distribution ratio of the braking force of the front wheel to the rear wheel. Because the change in the kingpin offset for the same amount of wheel stroke becomes greater when the slope of the suspension characteristic is small, the above condition is expressed as: slope in area (a)/slope in area (b)<distribution ratio of braking force for rear wheel/distribution ratio of braking force for front wheel.

Figure 2A:
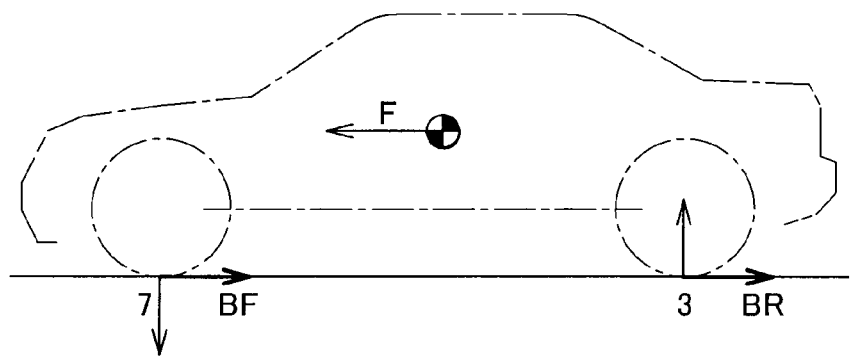
FIG. 2A shows the forces applied to the four-wheel in-wheel motor vehicle in braking according to the embodiment of the present invention.
Figure 2B:
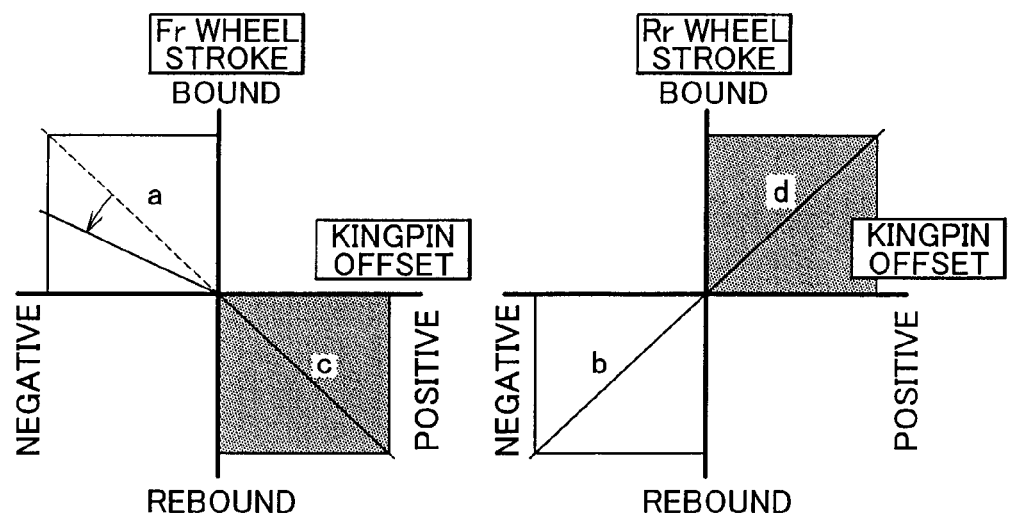
FIG. 2B shows charts illustrating specific examples of the suspension characteristics of a four-wheel in-wheel motor vehicle in braking according to the embodiment of the present invention.
Figure 2C:
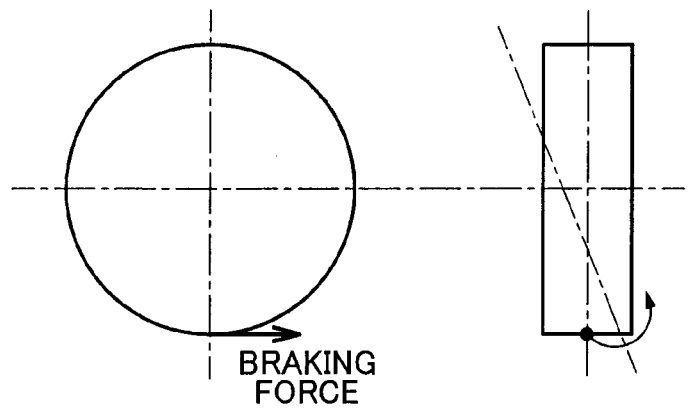
FIG. 2C shows the forces applied to a tire of the four-wheel in-wheel motor vehicle in braking according to the embodiment of the present invention.

FIGS. 2A through 2C show the forces applied to the four-wheel in-wheel motor vehicle in braking according to the embodiment of the present invention for determining the kingpin offset.

FIG. 2A shows the forces applied to the vehicle in braking. An inertial force F is applied to the center of gravity of the vehicle in the same direction as the traveling direction, and braking forces BF and BR are respectively applied to the front and the rear wheels of the vehicle in the direction opposite to the traveling direction. With the inertial force, the weight of the vehicle is shifted to the front side, and a large braking force is applied to the front wheel where a large load is applied. For example, a case will be studied that the ratio of the braking force between the front wheel and the rear wheel is approximately 7:3.

FIG. 2B is a chart showing a relation between the wheel stroke and the kingpin offset when the ratio of the braking force of the front wheel to the rear wheel is approximately 7:3. When the slope of the line showing the suspension characteristic of the rear wheel in the area (b) is set to 1, the slope of the line showing the same of the front wheel in the area (a) is set smaller than 3/7 in conformity with the distribution ratio of the braking force of the front wheel to the rear wheel. This characteristic is determined in consideration of the balance between the front wheel and the rear wheel, and therefore, the slope of the line showing the suspension characteristic of the rear wheel may be set to 7 and the slope of the line showing the same of the front wheel may be set smaller than 3. In this embodiment, straight lines are used for better understanding; however, a curve may be used as long as the proportion of the ratio of the change in the kingpin offset to the change in the wheel stroke for the front wheel to the same ratio for the rear wheel agrees the relation as described above. Furthermore, the suspension characteristic may not be determined such that the kingpin offset is set to zero when the wheel stroke is zero and may be determined arbitrarily in consideration of various conditions.

FIG. 2C shows the force applied to the tire of the in-wheel motor vehicle when the kingpin offset is determined to be negative in braking. The right diagram of FIG. 2C is a view of the tire seen from the rear side of the vehicle. As shown in the drawing, when the kingpin offset is determined to be negative, the moment is applied in the direction that the wheel tends to toe-in, and therefore, the force is applied to stabilize and restore the vehicle to its normal behavior. Determining the proportion of the ratio of the change in the kingpin offset to the change in the wheel stroke for the front wheel to the same ratio for the rear wheel by adjusting in accordance with the distribution ratio of the braking force of the front wheel to the rear wheel allows the in-wheel motor vehicle to stabilize its behavior in braking.

Referring back to FIG. 1, the behavior of the vehicle in driving will be studied next. In driving of the vehicle, the weight is shifted more to the rear side than in a resting state, and thus more load is applied to the rear wheel than to the front wheel. That is, the rear wheel is in bound, and the front wheel is in rebound. At this time, due to the load dependence of the tire described above, larger gripping force is applied to the rear tire where larger load is applied than to the front tire, and larger driving force is distributed to make driving force distribution larger on the rear wheel than on the front wheel. On the contrary, the driving force distribution becomes small on the front wheel.

The above state means that, in FIG. 1B, the front wheel is in a state shown as an area (c) and the rear wheel is in a state shown as an area (d). This state also means that both the front and the rear wheels are in a positive kingpin offset. However, when the kingpin offset is large in driving of the vehicle, the moment of a force may be generated about the kingpin axis and act as an excess force to hinder the driving force. Thus, in order to generate a stable driving force, the kingpin offset should be determined as close to zero as possible. The ratio of the change in the kingpin offset to the change in the wheel stroke for the rear wheel where larger driving force is distributed is preferably determined to be smaller than the same ratio for the front wheel. In order to achieve the above, the slope of the line showing the suspension characteristic in the area (d) in FIG. 1B is determined to be larger than the slope of the line showing the suspension characteristic in the area (c). Furthermore, in consideration of the proportion of the ratios, the proportion of the ratio of the change in the kingpin offset to the change in the wheel stroke for the rear wheel to the same ratio for the front wheel is preferably determined to be smaller than the distribution ratio of the driving force of the front wheel relative to the distribution ratio of the driving force of the rear wheel. In addition, the proportion of the ratio of the change in the kingpin offset to the change in the wheel stroke for the rear wheel to the same ratio for the front wheel is preferably determined to be smaller as the driving force increases. The above condition is expressed as: slope in area (c)/slope in area (d)<distribution ratio of driving force for front wheel/distribution ratio of driving force for rear wheel.

Figure 3A:
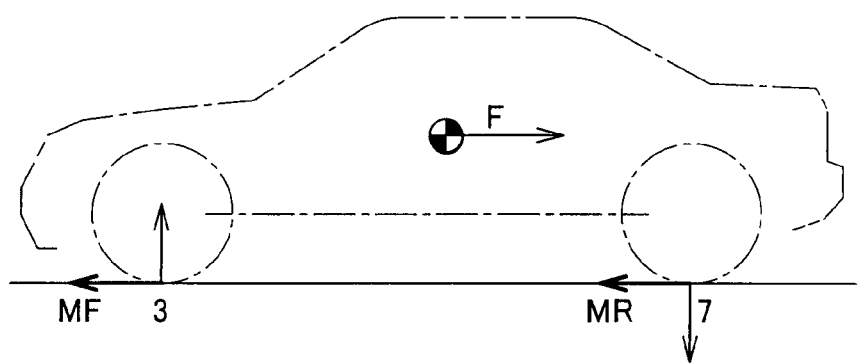
FIG. 3A shows the forces applied to the four-wheel in-wheel motor vehicle in driving according to the embodiment of the present invention.
Figure 3B:
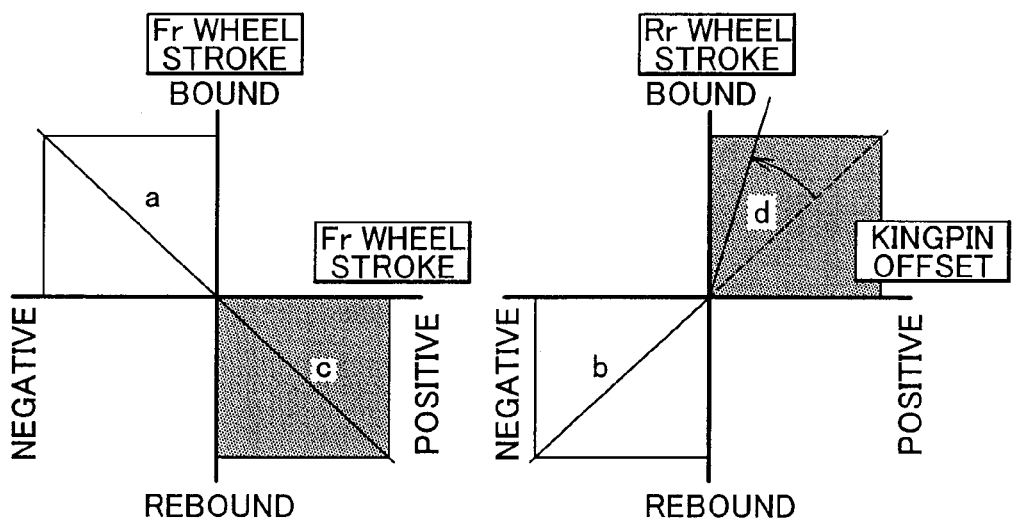
FIG. 3B shows charts illustrating specific examples of the suspension characteristics of a four-wheel in-wheel motor vehicle in driving according to the embodiment of the present invention.
Figure 3C:
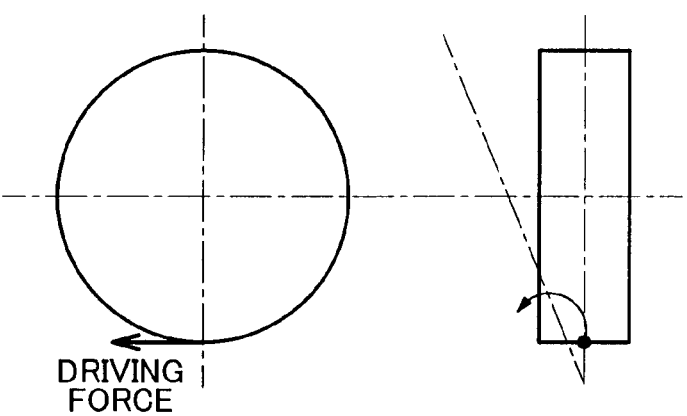
FIG. 3C shows the forces applied to a tire of the four-wheel in-wheel motor vehicle in driving according to the embodiment of the present invention.

FIGS. 3A through 3C show the forces applied to the four-wheel in-wheel motor vehicle in driving according to the embodiment of the present invention for determining the kingpin offset.

FIG. 3A shows the forces applied to the vehicle in driving. The force is applied in the opposite direction to the case in braking described for FIG. 2A. That is, an inertial force F opposite to the traveling direction is applied to the center of gravity. With this inertial force, the weight is shifted to the rear wheel, and the load applied to the rear wheel becomes greater than that to the front wheel. Due to the load difference, the distribution of driving forces MF and MR for the front and the rear wheels may differ. In this embodiment, a case is considered that the distribution of the driving force of the front wheel to the rear wheel is 3:7.

FIG. 3B shows the suspension characteristic of the change in the kingpin offset to the change in the wheel stroke for the front and the rear wheels in driving. Because it is preferred that the kingpin offset of the rear wheel where large driving force is applied is determined to be as small as possible, the slope of the line showing the suspension characteristic in the area (d) is determined to be large. For example, when the slope of the line showing the same of the rear wheel in the area (c) is set to 1, the slope of the line showing the same in the area (d) is set greater than 7/3. Similar to the description in braking shown in FIG. 2B, because the distribution balance of the driving force between the front and the rear wheels is important also in driving, the distribution ratio of the driving force is required only to be within the predetermined range in this embodiment. For example, the slope in the area (c) may be set to 3 and the slope in the area (d) may be set to greater than 7, or the suspension characteristic may be plotted as a curve. In addition, similar to the description in braking, the kingpin offset is not necessarily set to zero when the wheel stroke is zero.

FIG. 3C shows the force applied to the tire in driving with the determination according to the embodiment. The right diagram of FIG. 3C is a view of the tire seen from the rear side of the vehicle. As shown in FIG. 3B, the kingpin offsets for both the front and the rear wheels are determined to be positive, and the tire receives the driving force in the traveling direction, so that the stable moment is applied in the toe-in direction. As described above, the kingpin offset is determined to be as small as possible. Specifically, the proportion of the ratio of the change in the kingpin offset to the ratio of the change in the wheel stroke for the rear wheel to the same ratio for the front wheel is determined to be smaller than the distribution ratio of the driving force of the front wheel relative to the distribution ratio of the driving force of the rear wheel. In this case, for example, it is determined to be smaller than 3/7.

As described with reference to FIGS. 1 through 3, the four-wheel vehicle using the in-wheel motor according to the embodiment of the present invention can tend to understeering characteristic to stabilize and restore the vehicle's behavior to its normal behavior in braking and driving by determining the relation between the change in the wheel stroke and the change in the kingpin offset for the front and/or the rear wheel(s) based on the braking force distribution and the driving force distribution between the front and the rear wheels due to the load shift in braking and driving.

A case will be described next that the roll center heights of the four-wheel in-wheel motor vehicle according to the embodiment differs between the front and the rear wheels. When the roll center heights differ, an anti-dive force for the front wheel and an anti-lift force for the rear wheel are often generated in braking, and an anti-lift force for the front wheel and an anti-squat force for the rear wheel are often generated in driving, due to the suspension geometry. Therefore, in consideration of those forces described above as well as the distribution ratio of the braking force and the driving force, the relation between the change in the wheel stroke and the change in the kingpin offset for the front and/or the rear wheel(s) is determined. The following describes such a case.

FIG. 5 illustrates the states in consideration of the anti-dive force for the front wheel and the anti-lift force for the rear wheel in braking for the four-wheel in-wheel motor vehicle having different roll center heights between the front and the rear wheels.

FIG. 5A shows the relation of resultant forces applied to the vehicle when the total force F as the braking force is applied to the vehicle. Assuming that the braking force applied to the front wheel is $\beta F$, the braking force applied to the rear wheel is determined as $(1-\beta)F$. The inertial force applied to the entire vehicle is F along the traveling direction. When the force is divided into the anti-dive force for the front wheel, the inertial force, and the anti-lift force for the rear wheel in the vertical direction, the respective forces can be represented as shown in FIGS. 5B, 5C, and 5D.

FIG. 5B shows the anti-dive force for the front wheel. Assuming that the instantaneous rotation center is C1 and an angle between the contact patch and C1 is $\theta_1$, the anti-dive force for the front wheel can be expressed as $\beta \cdot F \cdot \tan \theta_1$ in the upward direction.

FIG. 5C shows the vertical inertial forces applied to the front and the rear wheels. Assuming that the height of the center of gravity is H and the length of wheelbase is L, the front wheel receives a downward inertial force of $F \times H/L$ by weight shift. In addition, the rear wheel receives an upward inertial force of the same magnitude, $F \times H/L$.

FIG. 5D shows the anti-lift force for the rear wheel. Assuming that the instantaneous rotation center of the rear wheel is C2 and an angle between the contact patch and C2 is $\theta_2$, the anti-lift force for the rear wheel can be expressed as $(1-\beta) \cdot F \cdot \tan \theta_2$ in the downward direction.

When the anti-dive force for the front wheel in the downward direction balances with the inertial force for the front wheel in the upward direction, the dive force for the front wheel becomes zero, and therefore, when $\beta \cdot F \cdot \tan \theta_1 = F \times H/L$, the dive force for the front wheel becomes zero. Similarly, when the anti-lift force for the rear wheel in the downward direction balances with the inertial force for the rear wheel in the upward direction, the lift force for the rear wheel becomes zero, and therefore, when $(1-\beta) \cdot F \cdot \tan \theta_2 = F \times H/L$, the lift force for the rear wheel becomes zero.

In order to stabilize the behavior of the vehicle, because the anti-dive force for the front wheel is more important than the anti-lift force for the rear wheel in braking, the front wheel where the anti-dive force for the front wheel is applied preferably tends to more toe-in. Accordingly, the suspension characteristic in the embodiment is determined such that the proportion of the ratio of the change in the kingpin offset to the change in the wheel stroke for the front wheel to the same ratio for the rear wheel is determined to be greater than the proportion of the anti-dive force for the front wheel to the anti-lift force for the rear wheel.

As described above, the suspension characteristics of the front wheel and/or the rear wheel are determined in consideration of the fact that in the vehicle having different roll center heights between the front and the rear wheels, the angles $\theta_1$ and $\theta_2$ between the instantaneous rotation centers (C1 and C2) and the respective contact patches of the front and rear wheels have different values. In this point, this embodiment is different from the embodiment with reference to FIGS. 1 through 3. The embodiment with reference to FIGS. 1 through 3 may be considered as the case that $\theta_1$ equals to $\theta_2$ in this embodiment.

According to this embodiment, the behavior of the vehicle can be stabilized in braking for the four-wheel in-wheel motor vehicle having different roll center heights between the front and the rear wheels.

A description will be next made of the suspension characteristic in driving in consideration of a case that the roll center heights are different between the front and the rear wheels with reference to FIG. 6. FIG. 6 shows the behavior of the vehicle and the relation of forces applied to the vehicle in consideration of the anti-lift force for the front wheel and the anti-squat force for the rear wheel in driving. Here, the vehicle described with reference to FIG. 5 is used in this embodiment.

FIG. 6A shows resultant forces applied to the four-wheel in-wheel motor vehicle in driving. In FIG. 6A, assuming that the entire driving force is F and the distribution ratio of the driving force of the front wheel to the rear wheel is determined as $\gamma: 1-\gamma$, the entire vehicle receives the inertial force F opposite to the traveling direction on the center of gravity, and the driving forces applied to the front wheel and the rear wheel are determined as $\gamma F$ and $(1-\gamma)F$, respectively. When the force is decomposed into the anti-lift force for the front wheel, the inertial force, and the anti-squat force for the rear wheel in the vertical direction, the respective forces can be represented as shown in FIGS. 6B, 6C, and 6D.

FIG. 6B shows the anti-lift force for the front wheel. Assuming that the instantaneous rotation center of the front wheel is C1 and an angle between C1 and the contact patch of the front wheel is $\theta_1$, the anti-lift force for the front wheel can be expressed as $\gamma \cdot F \cdot \tan \theta_1$ in the downward direction. This corresponds to the opposite of the anti-dive force for the front wheel in braking as described with reference to FIG. 5A. That is, the direction of the force is reversed to the downward direction, and the tangent depending on the instantaneous rotation center, $\tan \theta_1$, is the same as the description of FIG. 5A. In the four-wheel in-wheel motor vehicle, the driving force can be considered as the opposite of the braking force because the driving force is applied to the contact patch of the tire, which is the same as the point of application of the braking force.

FIG. 6C shows vertical inertial forces applied to the front and the rear wheels. Assuming that the height of the center of gravity is H and the length of the wheelbase is L, because the weight is shifted more to the rear wheel side by the inertial force F than in a resting state, the front wheel receives an upward force of $F \times H/L$ and the rear wheel receives a downward force of $F \times H/L$.

FIG. 6D shows the anti-squat force for the rear wheel. The instantaneous rotation center of the rear wheel will be the same C2 as that in braking, and therefore, the angle between C2 and the contact patch will also be the same $\theta_2$ as that in braking. The anti-squat force for the rear wheel thus becomes $(1-\gamma) \cdot F \cdot \tan \theta_2$ in the upward direction. This also corresponds to the opposite of the anti-lift force for the rear wheel in braking, as with the relation between the anti-dive force for the front wheel in braking and the anti-lift force for the front wheel in driving. That is, the direction of the force is reversed to the downward direction, and the magnitude of the forces equal to each other when the distribution ratio $\beta$ of the braking force and the distribution ratio $\gamma$ of the driving force are equal.

Here, when the anti-lift force for the front wheel $\gamma \cdot F \cdot \tan \theta_1$ equals to the upward inertial force $F \times H/L$ applied to the front wheel, the front wheel lift becomes zero, and when the anti-squat force for the rear wheel $(1-\gamma) \cdot F \cdot \tan \theta2$ equals to the downward inertial force $F \times H/L$ applied to the rear wheel, the rear wheel squat becomes zero.

In driving, the weight is shifted to the rear wheel side by the inertial force, and the rear wheel often serves an important role. Therefore, the proportion of the ratio of the change in the kingpin offset to the change in the wheel stroke for the rear wheel to the same ratio for the front wheel is preferably determined to be smaller than the proportion of the anti-lift force for the front wheel to the anti-squat force for the rear wheel. That is, the determination may be made such that: ratio of change in kingpin offset to change in wheel stroke for rear wheel/same ratio for front wheel < anti-lift force for front wheel, $\gamma \cdot F \cdot \tan \theta_1$/anti-squat force for rear wheel, $(1-\gamma) \cdot F \cdot \tan \theta_2$.

According to this embodiment, the behavior of the vehicle can be stabilized in driving for the four-wheel in-wheel motor vehicle having different roll center heights between the front and the rear wheels.

Figure 7A:
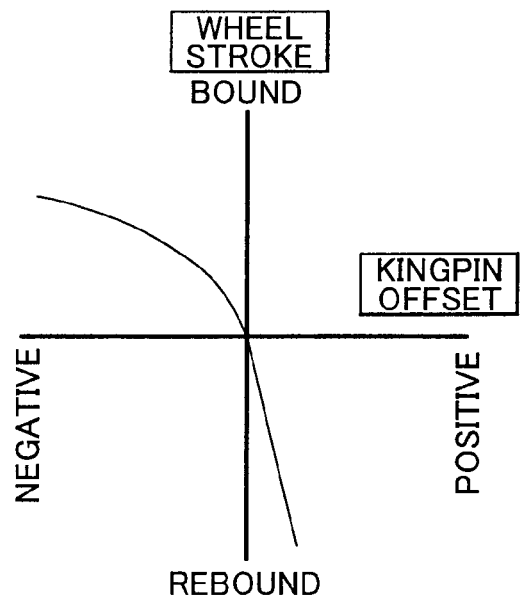
FIG. 7A is a chart showing a relation between changes in a wheel stroke and changes in a kingpin offset for a front wheel.
Figure 7B:
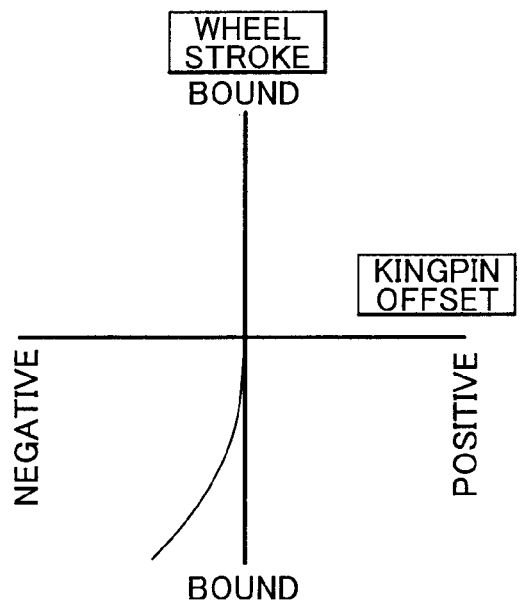
FIG. 7B is a chart showing a relation between changes in a wheel stroke and changes in a kingpin offset for a rear wheel.

Next, an example will be described that the front and the rear suspensions are determined in consideration of the restrictive conditions described above. FIGS. 7A and 7B show charts showing relations between changes in the kingpin offset and changes in the wheel stroke for the front and the rear wheels.

FIG. 7A is a chart showing the relation between the change in the wheel stroke and the change in the kingpin offset for the front wheel, and FIG. 7B is a chart showing the same relation for the rear wheel. Since the front wheel is in bound and the rear wheel is in rebound in braking, the determination is preferably made such that the kingpin offset in the bound area of the front wheel is greatly negative and the kingpin offset in the rebound area of the rear wheel is slightly negative. The second quadrant in FIG. 7A and the third quadrant in FIG. 7B respectively correspond to the situations as described above. The ratio of the change for the curve showing the suspension characteristic of the second quadrant in FIG. 7A is obviously greater than the ratio of the change for the curve showing the suspension characteristic of the third quadrant in FIG. 7B, and therefore, the determination is made to satisfy the restrictive conditions described above.

On the other hand, since the rear wheel is in bound and the front wheel is in rebound in driving, the determination is preferably made such that the ratio of the change in the kingpin offset in the bound area of the rear wheel is smaller than the ratio of the change in the kingpin offset in the rebound area of the front wheel. The fourth quadrant in FIG. 7A and the first and second quadrants in FIG. 7B respectively correspond to the situations as described above. The suspension characteristic of the fourth quadrant in FIG. 7A is determined as the positive kingpin offset, and the change in the kingpin offset is determined to be relatively small. On the other hand, the kingpin offset in the bound state for the rear wheel in FIG. 7B is determined on the axis indicating the wheel stroke, and the kingpin offset is determined to keep zero even if the magnitude of the wheel stroke changes. This is an example that the characteristic of the rear wheel represents an ideal condition, where the change in the kingpin offset relative to the wheel stroke for the rear wheel is determined to the minimum, 0, and to be securely smaller than the same change for the front wheel.

Figure 8A:
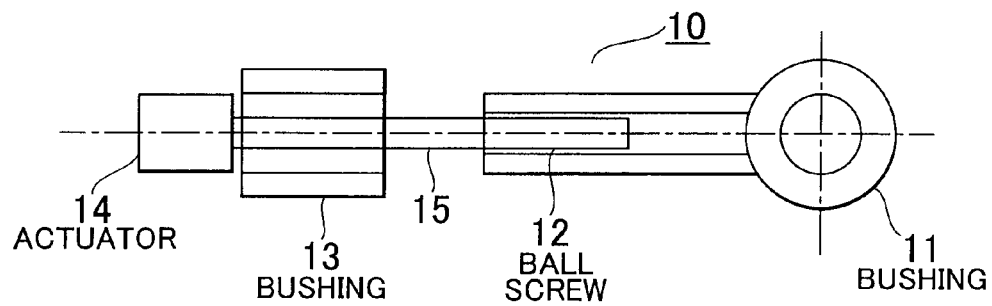
FIG. 8A is a schematic diagram showing an arm 10 used in a suspension.
Figure 8B:
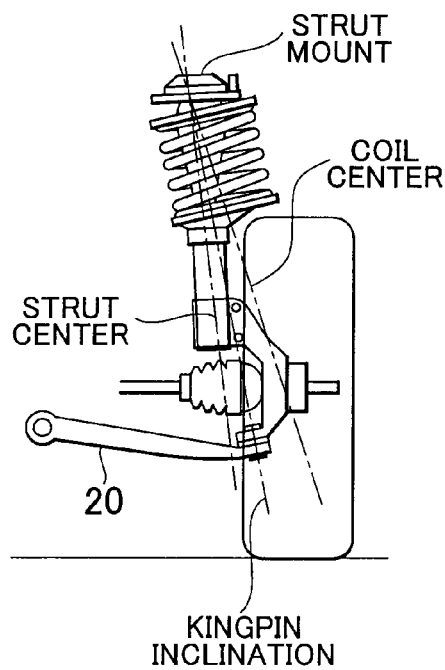
FIG. 8B is a diagram showing a strut type suspension system.
Figure 8C:
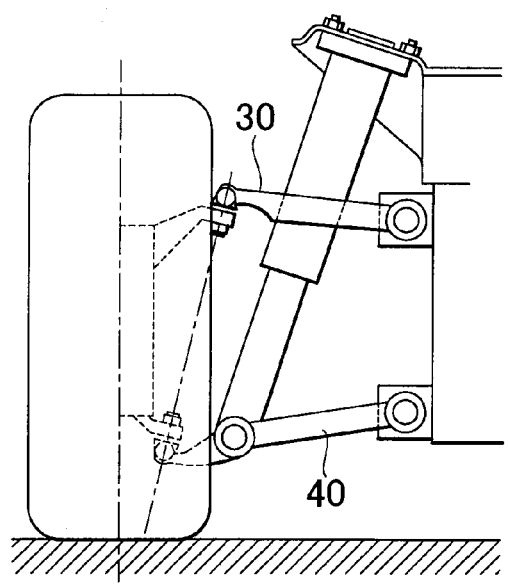
FIG. 8C is a diagram showing a double wishbone type suspension system.

An example of the specific determination means will be described next for the kingpin offset of the four-wheel in-wheel motor vehicle according to the embodiment of the present invention with reference to FIGS. 8A through 8C. FIGS. 8A through 8C show arms in the suspension systems of the vehicle and the suspension systems including the arms.

FIG. 8A is a schematic diagram showing an arm 10 used in a suspension. The arm 10 includes a bushing 11, a ball screw 12, a bushing 13, and an actuator 14. The bushing 11 is attached to the vehicle side, and the bushing 13 is attached to the wheel side. The ball screw 12 allows adjustment of the length of the arm 10, and the actuator 14 rotates the screw shaft 15 to allow the ball screw 12 to adjust the length of the arm 10.

FIG. 8B shows a strut type suspension system. The extendable arm 10 described above is used in a lower arm 20 in the suspension system. The lower arm 20 is extended and contracted to change the tread of the tire and adjust the kingpin offset.

FIG. 8C shows a double wishbone type suspension system. This suspension system can change the tread of the tire and adjust the kingpin offset, by changing the relation of arm lengths and angles of both an upper arm 30 and a lower arm 40. Also in this case, the arm 10 is used in either one of or both of the upper arm 30 and the lower arm 40 in the suspension system. The arm is extended and contracted to adjust the kingpin offset.

Although not shown, the kingpin offset can be adjusted by eccentric cams at attaching points of the lower arm 20, the upper arm 30, and the lower arm 40 on the vehicle side.

In this embodiment, any kind of determination methods or means are applicable as long as the kingpin offset can be adjusted to have the desired suspension characteristic as described above. Also, any suspension type, which includes a multi-link type suspension, is applicable.

If there is a restriction to the determination of the suspension geometry and the determination as described above cannot be made in the determination of the kingpin offset, the scale of the kingpin offset for the front and the rear wheels may be adjusted with an active suspension.

Figure 9:
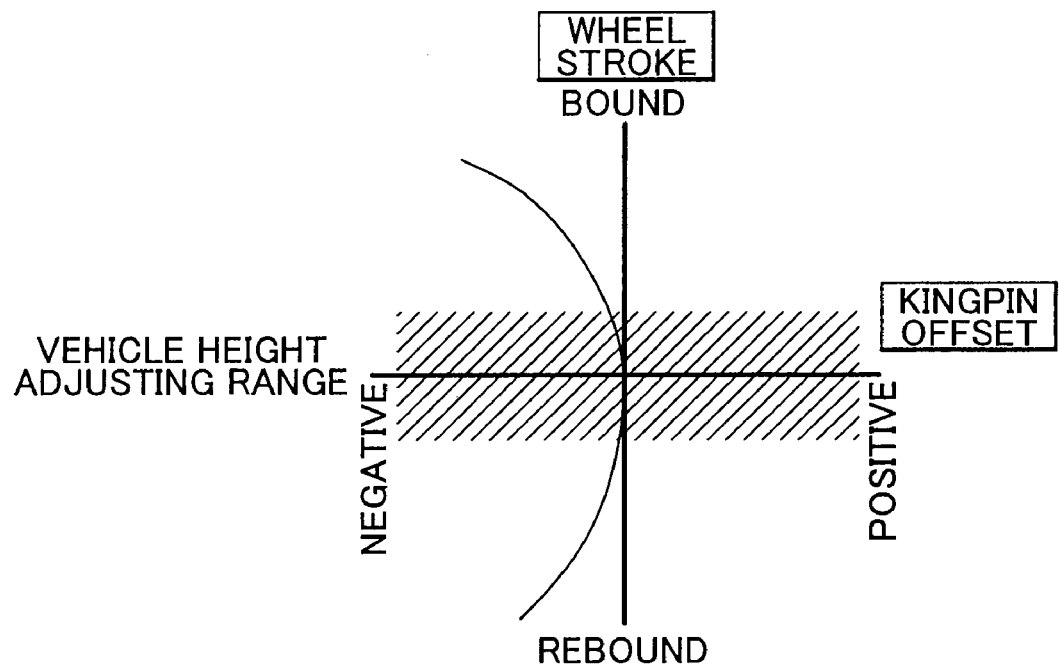
FIG. 9 is a chart showing an example of a suspension characteristic according to the embodiment of the present invention.

FIG. 9 shows the relation between the change in the wheel stroke and the change in the kingpin offset, in which the kingpin offset has an extreme value at the initial point of the wheel stroke. In this case, the scale of the kingpin offset for the front and the rear wheels can be determined by actively adjusting the vehicle height such that the extreme value of the kingpin offset appears precisely at the initial point of the wheel stroke. In addition, an electromagnetic suspension may be used as an example of the means for adjusting the vehicle height, and more specifically, an actuator may be provided to an end of a shock absorber to adjust the vehicle height, and an actuator may be provided to a bushing of an arm and may rotate the arm to adjust the vehicle height.

In the aforementioned embodiment, the distribution ratio of the braking force and/or the driving force of the front wheel to the rear wheel and the center rotational angle (angle between the instantaneous rotation center and the contact patch of a tire) of the front and the rear wheels are used as parameters. However, the present invention is applicable in consideration of other elements relating to suspensions. For example, cornering power and deformation of the tire may be considered.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A four-wheel vehicle comprising:
   a front wheel and a rear wheel each provided with an in-wheel motor,
   wherein an angle between an instantaneous rotation center of the front wheel and a front wheel contact patch is approximately the same as an angle between an instantaneous rotation center of the rear wheel and a rear wheel contact patch, and a relation between a change in a kingpin offset and a change in a wheel stroke for at least one of the front wheel and the rear wheel is such that a proportion of a ratio of the change in the kingpin offset to the change in the wheel stroke for the front wheel to a ratio of the change in the kingpin offset to the change in the wheel stroke for the rear wheel is determined to be greater than a distribution ratio of a braking force for the front wheel relative to a distribution ratio of a braking force for the rear wheel of the four-wheel vehicle in braking.

2. A four-wheel vehicle comprising:

a front wheel and a rear wheel each provided with an in-wheel motor, wherein an angle between an instantaneous rotation center of the front wheel and a front wheel contact patch is approximately the same as an angle between an instantaneous rotation center of the rear wheel and a rear wheel contact patch, and a relation between a change in a kingpin offset and a change in a wheel stroke for at least one of the front wheel and the rear wheel is such that a proportion of a ratio of the change in the kingpin offset to the change in the wheel stroke for the rear wheel to a ratio of the change in the kingpin offset to the change in the wheel stroke for the front wheel is determined to be less than a distribution ratio of a driving force for the front wheel relative to a distribution ratio of a driving force for the rear wheel of the four-wheel vehicle in driving.

3. A four-wheel vehicle comprising:

a front wheel and a rear wheel each provided with an in-wheel motor, wherein an angle between an instantaneous rotation center of the front wheel and a front wheel contact patch differs from an angle between an instantaneous rotation center of the rear wheel and a rear wheel contact patch, and a proportion of a ratio of a change in a kingpin offset to a change in a wheel stroke for the front wheel to a ratio of a change in a kingpin offset to a change in a wheel stroke for the rear wheel is determined to be greater than a ratio of an anti-dive force for the front wheel to an anti-lift force for the rear wheel in braking.

4. The four-wheel vehicle according to claim 3, wherein a proportion of the ratio of the change in the kingpin offset to the change in the wheel stroke for the rear wheel to the ratio of the change in the kingpin offset to the change in the wheel stroke for the front wheel is determined to be less than a ratio of an anti-lift force for the front wheel to an anti-squat force for the rear wheel in driving.

5. The four-wheel vehicle according to claim 1, wherein kingpin offsets for the front wheel and the rear wheel are determined to be negative in braking.

6. The four-wheel vehicle according to claim 2, wherein kingpin offsets for the front wheel and the rear wheel are determined to be negative in braking.

7. The four-wheel vehicle according to claim 3, wherein kingpin offsets for the front wheel and the rear wheel are determined to be negative in braking.

8. The four-wheel vehicle according to claim 4, wherein kingpin offsets for the front wheel and the rear wheel are determined to be negative in braking.

* * * * *